United States Patent [19]
Coleman et al.

[11] Patent Number: 5,921,841
[45] Date of Patent: Jul. 13, 1999

[54] SWIRLEE POP

[76] Inventors: Thomas J. Coleman, 19170 Paddock Pl., Abingdon, Va. 24211; William K. Schlotter, IV, 117 Wateredge Ln., Fredricksburg, Va. 22406; Princess Ann Coleman, 19170 Paddock Pl., Abingdon, Va. 24211; Ann M. Schlotter, 117 Wateredge Ln., Fredricksburg, Va. 22406

[21] Appl. No.: 08/901,524

[22] Filed: Jul. 28, 1997

[51] Int. Cl.⁶ .................................................. A63H 23/00
[52] U.S. Cl. ........................... 446/267; 446/71; 446/166; 426/104
[58] Field of Search .................................. 446/15, 20, 71, 446/74, 166, 267, 483; 426/104

[56] References Cited

U.S. PATENT DOCUMENTS

| | | | |
|---|---|---|---|
| 2,515,171 | 7/1950 | Abel | 446/166 |
| 2,589,757 | 3/1952 | Williams | 446/267 |
| 2,738,616 | 3/1956 | Windle | 446/267 |
| 2,752,725 | 7/1956 | Unsworth | 446/166 |
| 2,942,375 | 6/1960 | Bucic, Jr. | 446/15 |
| 3,425,152 | 2/1969 | Foulkes | 446/166 |
| 3,570,765 | 3/1971 | De Gast | 446/166 |
| 5,156,550 | 10/1992 | Alexander | 446/267 |
| 5,209,692 | 5/1993 | Coleman et al. | 446/71 |
| 5,264,267 | 11/1993 | Wang | 446/267 |
| 5,269,717 | 12/1993 | Tardif | 446/74 |
| 5,391,107 | 2/1995 | Coleman | 446/71 |
| 5,476,406 | 12/1995 | Cheng | 446/267 |

*Primary Examiner*—Robert A. Hafer
*Assistant Examiner*—Jeffrey D. Carlson
*Attorney, Agent, or Firm*—Melvin L. Crane

[57] ABSTRACT

The swirlee pop is a candy holding device including two parts. A main housing comprising a hollow cylindrical tube containing a luminescent colored liquid that flows freely from one end to the other end while being captured by an air trap in both ends as it flows which creates a wavy bubbly effect for visual enjoyment. The second part is a replaceable sucker that is attached to one end. A clear liquid could also be used successfully with free floating glittery objects or miniature toys encased with the housing for a variety of tastes and to suit all ages.

7 Claims, 1 Drawing Sheet

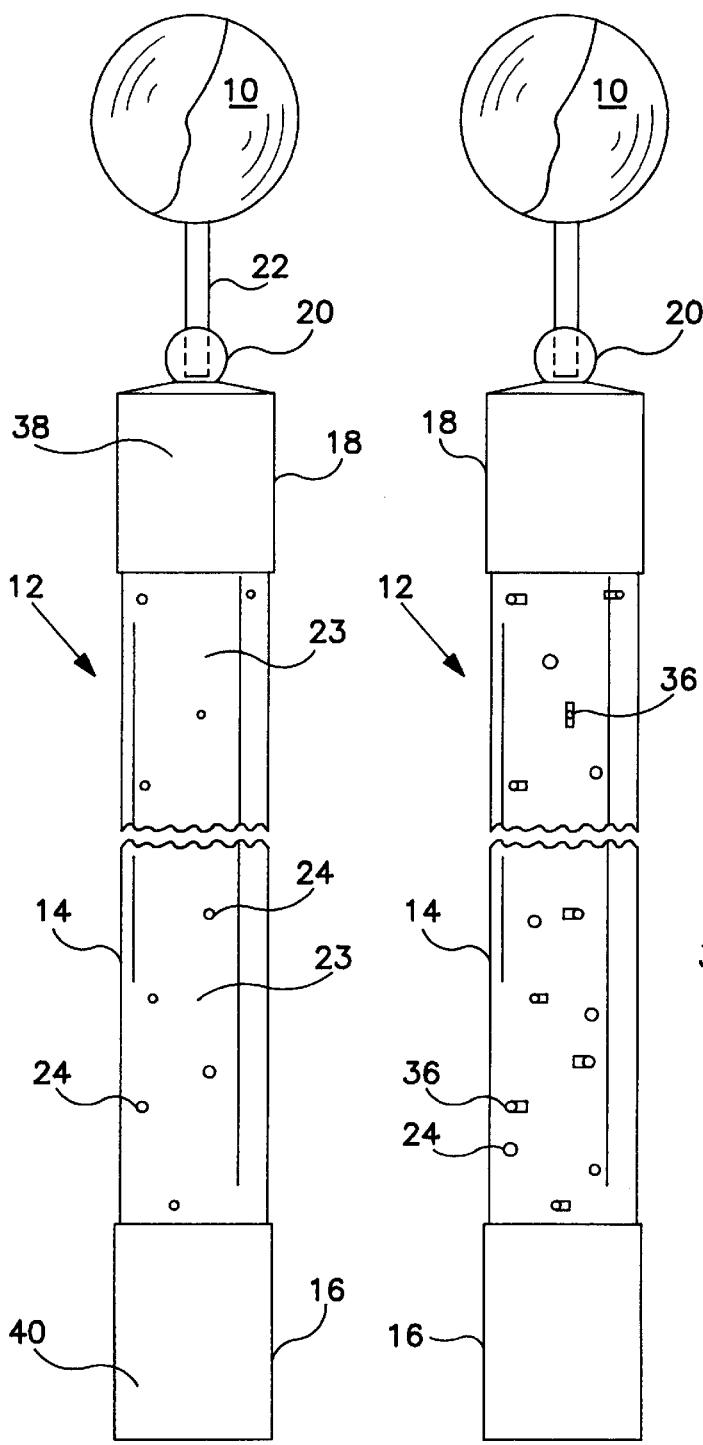
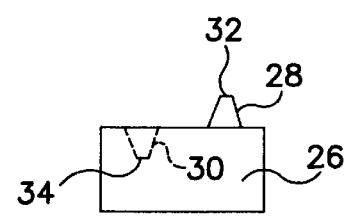
FIG. 3
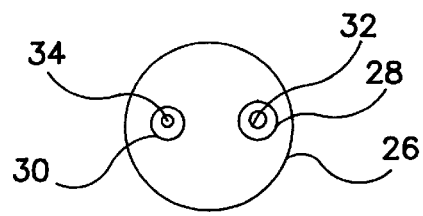
FIG. 4
FIG. 1
FIG. 2

SWIRLEE POP

This invention relates to a combination tube toy and a lollipop and, more particularly, to a tube toy which includes a fluid and air therein in which the air is controlled so that air bubbles will flow from one end to the other end when the tube is turned to a different position such as from end-to-end as when shaken slightly. A lollipop is secured to one end so that the lollipop can be consumed while holding the tube. Further, a clear fluid could be used in the tube with free floating glittery parts encased within the tube.

PRIOR ART

The known prior art includes an optically decorated elongated tube shown in U.S. Pat. No. 5,092,807 comprising brightly colored thin elongated tubes within the tube and disposed in a helical configuration. The tube also contains a fluid medium in which a plurality of light reflecting platelets are suspended.

U.S. Pat. No. 5,538,455 sets forth a multi-colored baton including a transparent tube with a helical partition extending coaxially therein. The helical partition forms two separate helical fluid chambers. Each of the chambers include a different colored light-transmissive fluid so that as light shines through the baton one can see two different colors with a blend of both colors.

U.S. Pat. No. 5,156,550 sets forth a transparent fluid vessel including double air trap chambers. The vessel includes two different fluids of different colors. As the vessel is rocked from side to side, different views of the fluids and air will be seen.

U.S. Pat. No. 5,264,267 sets forth a child's spoon, fork or the like. The handle is hollow and made of a transparent material which has a fluid therein in which a plurality of glittering particles are suspended. As the spoon is used, the glittering particles will move about within the handle to give a pleasing view to the child.

SUMMARY AND OBJECTS OF THE INVENTION

This invention is a combination of a lollipop and a hollow handle which includes therein an air pocket at each end and which includes a luminescent colored liquid and/or a clear liquid with floating glittery particles therein.

It is therefore an object of the invention to provide a lollipop holder in which the holder forms a picturesque handle for the lollipop.

Another object is to provide a lollipop holder in which moving the handle to different positions forms a wavy bubbly effect or different glittery scenes as the handle is moved.

Yet another object is to provide an amusing handle for a lollipop which is attractive and amusing.

Other objects and advantages of the invention will become obvious to those skilled in the art from the drawings accompanied by the following description.

BRIEF DESCRIPTION OF THE DRAWINGS

FIG. 1 is a side view of the device illustrating air bubbles along the handle length;

FIG. 2 is a side view illustrating glittery particles floating in a fluid in the handle.

FIG. 3 is a side view of a dual venturi device which is secured near each end of the handle; and FIG. 4 is a top view of the venturi device illustrating a central aperture through which air and fluid can flow.

DETAILED DESCRIPTION

Now, referring to the drawings, there is shown in FIG. 1 a lollipop 10 with an amusing handle 12 to which the lollipop is secured. The handle includes a transparent tubular housing 14 made of plastic or any other suitable transparent material with a luminescent colored fluid therein that flows freely from one end of the handle to the other. The housing includes opposite end closures 16, 18. The upper end closure is provided with a holder 20 to which one end of a lollipop stick 22 is secured. The lollipop is secured to the opposite end of the stick 22. In order to create a wavy bubbly effect in the fluid 23 as noted by the small circles 24 in FIG. 1, there is provided at each end of the tubular housing a venturi type device 26. As shown in FIGS. 3 and 4, the venturi type device 26 includes oppositely directed conical shaped parts 28, 30 each of which have a central aperture 32, 34, respectively.

FIG. 2 has the same construction as that of FIG. 1, except that the fluid within the housing is clear and there are free floating glittery particles 36 within the fluid.

In operation of the device, air and fluid pass through the aperture 34 at the upper end of the housing to form bubbles 24 as the air and fluid flow from an upper air space 38 out into the housing. The fluid and air flow through the opening 32 at the bottom of the housing into an air space 40. If the housing is positioned so that the air and fluid pass from the air space 40 through the opening 32 at the bottom of the housing, then the air bubbles will move toward the top as the air and fluid pass through the venturi opening 32 at the upper end into air space 38.

The device of FIG. 2 operates the same way as for FIG. 1 except that the particles 36 cannot pass through either passage 32 or 34 and will move up or down within the fluid depending on the position of the housing handle. The glittery objects could include small toys which could move in the fluid.

Once the lollipop has been consumed, it can be replaced by another lollipop by removing the stick from the holder and replacing the stick to be expended by another stick which includes a lollipop thereon.

The foregoing relates to preferred exemplary embodiments of the invention, it being understood that other variants and embodiments thereof are possible within the spirit and scope of the invention, the latter being defined by the appended claims.

What is claimed is:

1. A swirlee pop which comprises a transparent housing having an upper end and a lower end and a central chamber area, an upper end cap and a lower end cap on said upper end and said lower end of said housing, a fluid and air in said housing, a dual venturi device in each end cap, each said dual venturi device defines an air trap at each end and provides two passages leading from the air trap to the central chamber area and therefore permits air and said fluid to flow in each passage direction through said dual venturi device to and from said air trap in opposite ends relative to said upper and lower end caps, and a candy stick holder for securing a lollipop on said upper end cap.

2. A swirlee pop as set forth in claim 1, in which,
said fluid in said housing is luminescent colored.

3. A swirlee pop as set forth in claim 1, in which,
said candy stick holder secures a lollipop stick therein with a lollipop on said stick.

4. A swirlee pop as set forth in claim 2, in which,
said candy stick holder secures a lollipop stick therein with a lollipop on said stick.

5. A swirlee pop as set forth in claim 1, in which,
said fluid in said housing is a clear liquid.

6. A swirlee pop as set forth in claim 4, in which,
said clear liquid includes free floating glittery particles therein between said dual venturi devices within said upper and lower end caps.

7. A swirlee pop as set forth in claim 4, in which,
said clear liquid includes small free floating glittery toys therein between said dual venturi devices within said upper and lower end cap.

* * * * *